United States Patent Office 2,777,817
Patented Jan. 15, 1957

2,777,817
FLUIDIZING LECITHIN

Emil F. Werly, Minneapolis, Minn., assignor to Pillsbury Mills, Inc., Minneapolis, Minn., a corporation of Delaware No Drawing. Application October 3, 1952, Serial No. 313,047

3 Claims. (Cl. 252—1)

This invention relates to fluidizing lecithin and more particularly to the reduction and control of the viscosity of commercial lecithin as well as to the fluidized product formed thereby.

It has long been known that in certain uses of commercial lecithin, the viscosity plays an important part. The lecithin is usually obtained from soybean oil, hydrating in order to precipitate out the lecithin in the form of a sludge, then subsequently centrifuging and drying out the product. Lecithin in this form may contain from 25 to 40 percent soybean oil with the remainder comprising in the main a mixture of phosphatides composed of about one-third pure lecithin, one-third cephalin and one-third inositol phosphatide, such additional substances as carotenes being present in small quantities.

The lecithin is used largely as an emulsifying agent in the manufacture of bakery goods, margarines, chocolate goods, emulsion paints and other widely different products. It is difficult to work with the highly viscous product when obtained in its crude commercial form. The gummy substance is difficult to weigh or measure and also is difficult to mix or disperse in other products. For this reason, it is desirable to fluidize the lecithin and several previous methods have been employed to so reduce the viscosity. One of these methods embodies the addition of free fatty acids and is at present the most widely accepted of the fluidizing processes. There are, however, several disadvantages arising from the use of free fatty acids, among which are the increase in the acid number of the product due to the fatty acid content and a decrease in the hydrophilic nature of the product, the acids being more hydrophobic. Furthermore, the viscosity is difficult to control. Most users prefer not only a fluidized lecithin but also one which has a uniform and consistent viscosity. The term "fluidizing" as used herein means converting a plastic or wry difficulty pourable mass into one which is pourable. It is understood, of course, that because of the thixotropic quality of certain plastic and gummy masses, including lecithin, the viscosity as measured in a viscosimeter does not measure pourability at high viscosities (e. g. at 30,000 to 50,000 centipoises). At lower viscosities, however, the viscosity measurements are fairly indicative not only of pourability itself but of the degree of pourability.

I have found that lecithin may be fluidized to a satisfactory degree and at the same time the above objections may be overcome by mixing the same with monoglycerides having a normally liquid form in the ordinary range of temperatures employed. In the use of fatty acids for fluidizing, both liquid and solid fatty acids may satisfactorily fluidize the product. I have found, however, that in the case of monoglycerides only the liquid monoglycerides are satisfactory for the purpose of fluidizing commercial lecithin.

I have tried a number of monoglycerides, all of which give good results, the particular ones recommended being mono-olein, mono-linolein, mono-linolenin, or a mixture of the above such as may be naturally obtained from mono-glycerides procured from soybean oil. There are two usual methods of obtaining monoglycerides. The first of these is glycerolysis and is accomplished by treating a glyceride oil with glycerine until the triglycerides are sufficiently reduced to the diglycerides and mono-glycerides. Excess glycerine should then be reduced or removed from the product. The other process involves esterification of fatty acids with glycerine, but it is preferred to obtain the monoglycerides by the first treatment since it is more economical. A representative product obtained from the glycerolysis of soybean oil, and after stripping of free glycerine, contained 40–50% mono-glycerides, 40–45% diglycerides and 15–20% triglycerides, the monoglycerides in the mixture of course being the active fluidizing portion.

I have performed a number of experiments with commercial lecithin from different sources and hence containing a variable amount of acetone insolubles which is a measure of the phosphatide content. In addition to the useful discovery that the above mentioned monoglycerides would effectively fluidize the lecithin I found that I could further reduce the viscosity and control the uniformity of results. The latter discovery grew out of an observation that liquid monoglycerides would always fluidize the commercial lecithin but that the results were not consistent, some of the lecithin products obtained being quite fluid in nature and others of a higher viscosity or variable pourability. Upon further experimentation I discovered that the quality of the fluidization with the monoglycerides could be altered and controlled by the addition, along with a measured quantity of the monoglyceride, of a glyceride oil, either of animal or vegetable origin and selected from the class including, by way of example, corn oil, lard oil, soybean oil, peanut oil and cottonseed oil. A given sample of commercial lecithin may contain a certain amount of soybean oil such as, for example, 30%. When my monoglyceride fluidizing agent is added gradually to the gummy commercial lecithin, the first significant effect is conversion from a plastic substance to a true fluid. Then, with the further addition of small increments of the monoglyceride, the viscosity becomes rapidly lower until finally the reduction of viscosity levels off at a slow rate. Contrary to expected results, further addition of monoglyceride does not materially reduce viscosity except by way of ordinary dilution. The simple dilution of lecithin with monoglyceride would, of course, be an unnecessarily expensive way in which to reduce the viscosity thereof. It should be noted that the first portion of monoglyceride added to cause initial fluidization need only be a surprisingly small fraction of the amount which one would expect to be required as a mere diluent. The monoglyceride fluidizing agent is therefore a valuable contribution to the art of fluidizing lecithin.

The following are representative examples which will point up the fluidizing effects of monoglycerides alone and with other combinations as hereinafter set forth:

Example I

A regular commercial grade of lecithin having an acetone insoluble content of 69.3% was divided into three portions of 200 g. each. To one was added soybean monoglyceride mixture having 40% monoglycerides and with about 4% free glycerine. To the second was added a quantity of the same soybean monoglyceride with the glycerine stripped therefrom and to the third was added a glyceral oleate mixture having 40% glycerine monooleate. The viscosity is reported in centipoises and was measured at 65% F.

| Sample composition of fluidized lecithin: | Viscosity in centipoises (65° F.) |
|---|---|
| 1. 4% soybean monoglyceride (not stripped) | 36,500 |
| 2. 4% soybean monoglyceride (stripped) | 35,600 |
| 3. 4% mono-oleate | 35,300 |

It is to be noted that the presence of free glycerine did not help the fluidizing process since sample 1, which contained the free glycerine, and sample 2, which was stripped of its free glycerine, were fluidized to about the same degree. Sample 3 is representative of the effect of the selection of a simple monoglyceride, the results under similar circumstances giving approximately the same viscosity as samples 1 and 2. Although the viscosity is high the degree of fluidization is satisfactory and commercial lecithin so treated will be pourable.

As a cooperative fluidizing agent, the use of which produces further surprising and efficient results, I may employ a glyceride oil of the class above mentioned in conjunction with the monoglyceride in order to multiply the effect of the fluidizing agent in attaining a lower and consistent viscosity. Although adding alone a vegetable or animal glyceride of the class described to commercial lecithin will make the lecithin somewhat less viscous, the effect is no more than one might expect when using any liquid as a diluent for a plastic and gummy mass. Now, however, when I add to this same gummy lecithin a mixture of the glyceride oil and the monoglyceride fluidizing agent, the viscosity is reduced way beyond the expected additive result.

*Example II*

A series of samples of commercial lecithin was prepared using from 2% to 11% glyceride oils, including soybean oil, as an additive for decreasing viscosity. All the samples, although visibly altered to a greater degree by the diluent effect of the oils, were incapable of measurement since the samples were all unfluidized and still plastic.

*Example III*

A series of samples of a commercial lecithin having an acetone insoluble content of 69.3% was prepared with various increments of soybean monoglyceride mixture having 40% monoglyceride content and the samples were all satisfactorily fluidized as follows:

| Sample composition of fluidized lecithin: | Viscosity in centipoises (75° F.) |
|---|---|
| 1. 1% soybean monoglyceride | Plastic |
| 2. 2% soybean monoglyceride | 27,100 |
| 3. 4% soybean monoglyceride | 21,800 |
| 4. 6% soybean monoglyceride | 19,300 |
| 5. 8% soybean monoglyceride | 16,200 |

It is to be noted that the lecithin was fluidized all the way from a plastic state to a fluidized state having a viscosity of 27,100 centipoises in merely increasing the monoglyceride content from 1% to 2%. A lesser effect was noted in the increase from 2% to 4% with a drop of 5,300 centipoises. Then, in increased increments of 2%, namely, from 4 to 6 to 8%, the drop in viscosity averaged about 2,700 centipoises. The further addition of monoglyceride in this case merely reduced viscosity because of the expected diluent effect.

*Example IV*

A series of samples of commercial lecithin having an acetone insoluble content of 71.4% was prepared with a mixture of monoglyceride and glycerine oils as follows:

| Sample composition of fluidized lecithin: | Viscosity in centipoises (75° F.) |
|---|---|
| 1. 2% soybean monoglyceride plus 6% soybean oil | 9,800 |
| 2. 3% soybean monoglyceride plus 5% soybean oil | 10,300 |
| 3. 4% soybean monoglyceride plus 4% soybean oil | 11,800 |
| 4. 5% soybean monoglyceride plus 3% soybean oil | 10,000 |
| 5. 6% soybean monoglyceride plus 2% soybean oil | 16,500 |

The fluidized lecithin, which would be bearly pourable with but 2% of monoglyceride, acquires a viscosity of less than half of that where 6% glyceride oil is added. Although the glyceride oil itself would not even measurably decrease the viscosity, when combined with the monoglyceride a multiplied effect is obtained. Throughout the range of 2 to 5% monoglyceride where the glyceride oil is correspondingly decreased from 6% to 3%, the constant total percentage of fluidizing medium results in a fairly uniform comparative viscosity. Obviously it is desirable to use as little of the monoglyceride as will effectively fluidize the product. Thus for a given commercial lecithin product, the minimum known quantity of monoglyceride which will effect the desired fluidization is used, and the amount of glyceride oil is adjusted to obtain the desired viscosity. Differences between batches of commercial lecithin can be overcome so as to produce a uniform liquified product.

It may thus be seen that I have discovered a new and useful product and method of fluidizing commercial lecithin and can thereby produce a pourable and easily handled product which will have improved chemical and physical properties for specific purposes in the trade. My fluidized product and method for preparation thereof involves the use of the simple monoglycerides of the class described in proportions such as to effect fluidization. I can further control the effect and viscosity attained by my fluidizing medium to a degree far in excess of expected cumulative results by the further addition of a vegetable or animal glyceride oil in predetermined ratio and amounts.

What I claim is:

1. The method of fluidizing and controlling the viscosity of lecithin in the conversion thereof from a plastic state to a liquid state, which consists in the controlled mixture therewith of 2 to 6% of a glyceride oil from the group consisting of corn oil, soybean oil, lard oil, peanut oil, and cottonseed oil, and adding 2 to 8% of a liquid monoglyceride from the group consisting of mono-olein, mono-linolein and mono-linolenin until the plastic product has been fluidized to a liquid.

2. A fluidized lecithin product having improved hydrophilic quality as an emulsifying agent, said improvement being effected without materially increasing the acid value, consisting essentially of a mixture of commercial gummy lecithin, 2 to 6% of soybean oil, and 2 to 8% of a liquid soybean monoglyceride.

3. The method of fluidizing commercial lecithin in the conversion thereof from a plastic state to a liquid state, which consists in mixing therewith 2 to 8% of soybean monoglyceride, and from two to six percent of soybean oil.

References Cited in the file of this patent

UNITED STATES PATENTS

| 2,194,842 | Wiesehahn | Mar. 26, 1940 |
| 2,287,838 | Stanley | June 30, 1942 |
| 2,402,690 | Stanley | June 25, 1946 |
| 2,555,137 | Karjala | May 29, 1951 |